United States Patent [19]
Nupp
[11] 3,845,402
[45] Oct. 29, 1974

[54] SONOBUOY RECEIVER SYSTEM, FLOATING COUPLER

[75] Inventor: Raymond W. Nupp, Rochester, N.Y.

[73] Assignee: EDMAC Associates Inc., Rochester, N.Y.

[22] Filed: Feb. 15, 1973

[21] Appl. No.: 332,626

[52] U.S. Cl. .......... 330/10, 328/21, 330/75
[51] Int. Cl. .......... H03f 3/38
[58] Field of Search .......... 330/7, 10, 75; 329/192; 324/118; 332/37 D; 328/21, 22

[56] References Cited
UNITED STATES PATENTS

| | | | |
|---|---|---|---|
| 2,832,848 | 4/1958 | Neff | 330/10 |
| 2,961,614 | 11/1960 | Neff | 330/10 |
| 3,005,163 | 10/1961 | Dulberger et al. | 330/10 |
| 3,369,186 | 2/1968 | Leton | 330/10 |
| 3,631,329 | 12/1971 | Kimball | 330/10 X |

*Primary Examiner*—Herman Karl Saalbach
*Assistant Examiner*—James B. Mullins

[57] ABSTRACT

A modulation-demodulation floating coupler for use in a Sonobuoy Receiver to perform the function of an isolation transformer operating over a wide frequency band with very little phase shift is disclosed. The coupler is responsive to a high frequency composite input signal having a carrier portion on which is modulated a baseband information portion which is to be coupled and includes a transformer for coupling the composite signal to a pair of demodulators, the first of which provides an output with no ground reference, and the second demodulator produces a local feedback signal for gain and distortion control.

1 Claim, 1 Drawing Figure

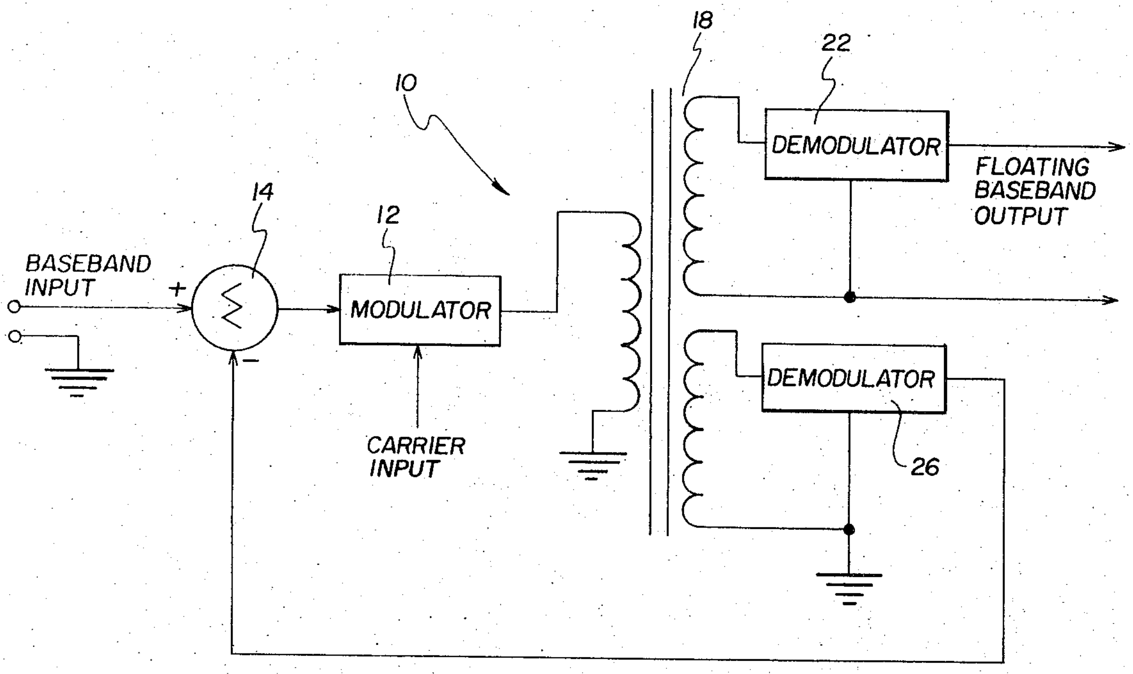
10
18
22
DEMODULATOR
FLOATING
BASEBAND
OUTPUT
14
12
BASEBAND
INPUT
+
MODULATOR
−
DEMODULATOR
CARRIER
INPUT
26

SONOBUOY RECEIVER SYSTEM, FLOATING COUPLER

BACKGROUND OF THE INVENTION

The present invention relates to floating couplers for use in sonobuoy receiver systems.

As is well known in the art, a Sonobuoy Receiver is an airborne receiving system which forms a portion of a radio link between a submerged hydrophone and an acoustic signal processor. In order to provide the desired flexibility for the various aircraft configurations which may be encountered, it is necessary to provide a receiver output signal which can be utilized to drive either a differential input processor or a processor having an unbalanced input. Previous experience has indicated that aircraft ground loops frequently caused the formation of false signals, often referred to as "artifacts." Accordingly, the art has determined that it is useful not to utilize an unbalanced output, but rather use an output floating signal entirely above ground level.

There are several common and well known techniques for isolating a signal from ground. The first of these is an isolation transformer. Unfortunately a transformer with the required amplitude and phase characteristics is often of such a physical size to make it impractical. A second method uses a differential amplifier configuration. However, such a circuit has demanding performance requirements, and exacting component tolerance requirements, and a difficulty in meeting performance requirements after component aging and/or replacement.

SUMMARY OF THE INVENTION

It is an object of this invention to provide an improved coupler which can be used to minimize ground loops in applications of sonobuoy receivers.

It is a further object of this invention to provide a coupler using improved feedback techniques to provide high ground isolation, unlimited common mode range, and improved linearity and noise characteristics.

In accordance with the invention there is provided a coupler including an amplitude modulator which receives both a "baseband" signal which is to be coupled, and a "carrier" signal of much higher frequency on which this information is modulated. The composite signal is then transformer coupled to two identical peak demodulators. One of these demodulators provides a floating output while the other provides a ground referenced output which is used for feedback purposes to be mixed with the baseband signal. In accordance with the invention, either amplitude or angle modulation will perform satisfactorily. However, amplitude modulation generally tends itself to simpler modulation and demodulation apparatus.

A feature of the invention is the use of transformer coupling which allows the levels relative to ground to be shifted in any manner with the only constraint being the insulation breakdown of the windings. The attainable bandwidth of the baseband information is from about ten percent of the carrier frequency down to DC.

BRIEF DESCRIPTION OF THE DRAWING

The sole drawing is a diagram partially in block and partially in schematic form of a floating coupler in accordance with the invention.

DESCRIPTION OF THE PREFERRED EMBODIMENT

This invention concerns the unique combinations of well known elements. Accordingly, many of such elements have been shown in block form since they are selectable from there in the art.

Turning now to the drawing, there is shown a floating coupler 10 which receives a baseband input signal (referenced to ground) and produces a ground isolated differential or floating baseband output signal. A modulator 12 (which may be a simple conventional AM "pinch" modulator) provides a composite output consisting of a carrier signal and baseband information translated in frequency and consisting of sideband information centered about the carrier. The carrier signal may be produced by any convenient source. The composite signal is then coupled by a transformer 18 to two identical demodulators 22 and 26. It should be noted that the coupling transformer need pass only a frequency spectrum of about ± 10 percent of the carrier frequency, while the baseband information may have a bandwidth of many decades. Therefore, the embodied apparatus usually results a very large savings in transformer cost, size, and weight. The demodulators 12 and 26 reconstruct the baseband input to the modulator.

Since demodulators 22 and 26 are identical, the reconstructed baseband signals from each are consequently also identical. Because of the illustrated connection, the output of demodulator 22 is completely isolated from ground. The output of demodulator 26 is referenced to ground, as is the coupler input signal, and hence, an input-output signal comparison is easily accomplished using feedback techniques.

Prior to entering the modulator the input baseband information is combined with the output of the demodulator 26 in network 14. The difference of the two signals is then inputed to the modulator. This negative feedback signal nearly eliminates the effects of nonlinearities and gain changes in the modulator circuits. The effects of nonlinearities and gain changes in the demodulators are also reduced provided the two demodulators behave in an identical manner. If an AM modulation system is used the losses in the coupling transformer will not affect the system gain, but the relative signal strength provided to the two demodulators will have a direct effect on the coupler gain. If angle modulation is utilized the signal strengths at the demodulators will not affect coupler gain.

As with any negative feedback system care must be exercised in the selection of the phase/frequency characteristics of each of the elements within the feedback loop. When properly selected, feedback facilitates the obtaining of a very flat frequency/phase characteristic over many decades of baseband information. This characteristic is important in the embodied application.

I claim:

1. A floating coupler for a sonobuoy receiver system which in response to an input A. C. baseband ground reference signal and a carrier signal produces an output baseband signal decoupled from ground reference, comprising:

a. an A.M. pinch modulator responsive to the input signal and the carrier signal for amplitude modulating the carrier signal with the input signal;

b. transformer electrically coupled to said modulator;

c. first and second substantially identical demodulators coupled to said transformer and responsive to the modulated carrier signal so that said first demodulator produces the output signal and said second demodulator produces a feedback ground referenced baseband signal; and d. feedback means including a summing network responsive to the feedback ground reference signal produced by said second demodulator and the input signal for effecting a change in the input signal before it is received by said modulator for reducing effects of non-linearities and gain changes in the floating coupler.

* * * * *